Nov. 23, 1943.  L. L. SALFISBERG  2,335,159
ADHESIVELY SEALED PACKAGE
Filed Sept. 30, 1941   2 Sheets-Sheet 1
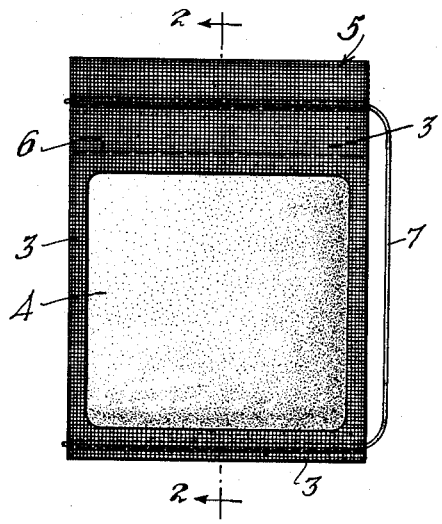
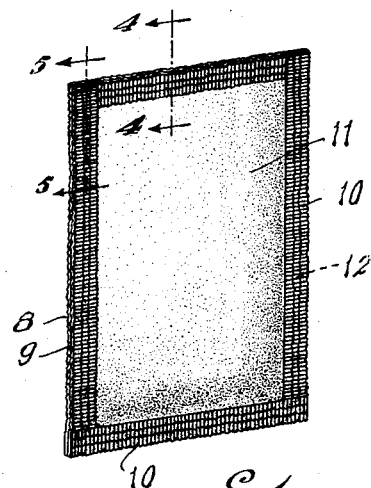
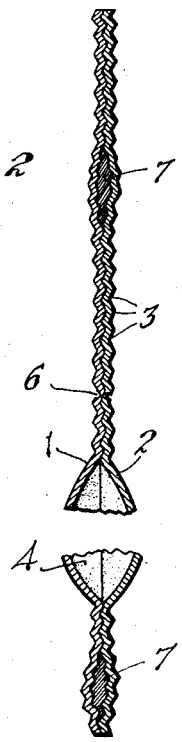
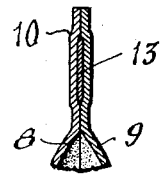
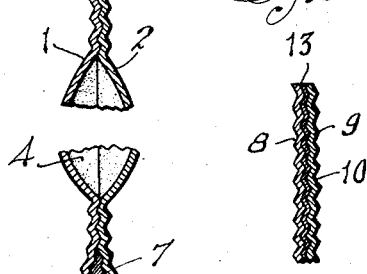
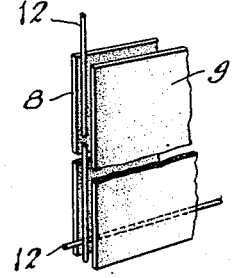
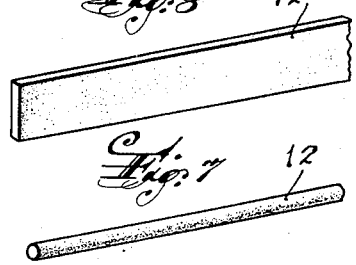
INVENTOR
Leroy L. Salfisberg,
BY
Harry B. Rook,
ATTORNEY Nov. 23, 1943.　　L. L. SALFISBERG　　2,335,159
ADHESIVELY SEALED PACKAGE
Filed Sept. 30, 1941　　2 Sheets-Sheet 2
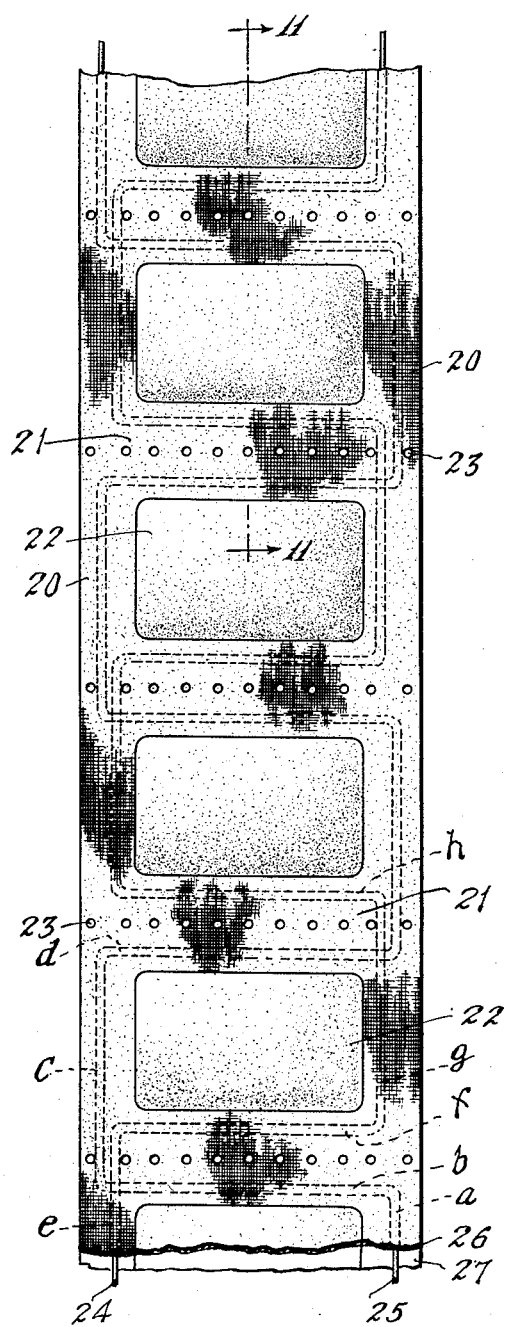
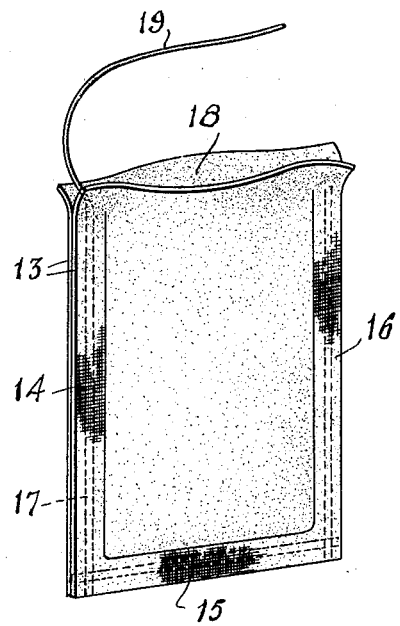
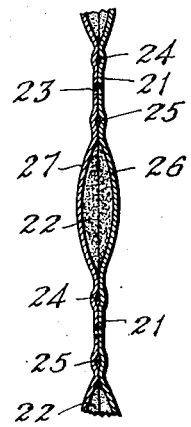
INVENTOR
Leroy L. Salfisberg,
BY
Harry B. Rook,
ATTORNEY Patented Nov. 23, 1943

2,335,159

UNITED STATES PATENT OFFICE 2,335,159

ADHESIVELY SEALED PACKAGE

Leroy L. Salfisberg, South Orange, N. J., assignor to Ivers-Lee Company, Newark, N. J., a corporation of Delaware Application September 30, 1941, Serial No. 412,953

2 Claims. (Cl. 229—53)

This invention relates in general to the art of adhesively securing sheets, strips, ribbons or strands of material together, and more particularly the invention contemplates an adhesively sealed package and a method of making it.

According to one general practice of making packages of sheet material, certain zones of layers or plies of the sheet material are secured or sealed together by an adhesive to form commodity receiving compartments between the layers or plies. In some cases said certain zones are pre-coated with an adhesive substance that is normally dry but is made adhesive or tacky just prior to or during the sealing operation. Some such adhesives become tacky upon application of heat, being thermoplastic, and thereafter harden again, while other adhesives become tacky when moistened and thereafter dry and harden. In other cases a liquid adhesive is applied to the zones of the layers or plies to be secured together just prior to the sealing operation. In all such cases the adhesive coatings are thin or film-like and it is frequently difficult to obtain firm or satisfactory sealing together of the layers or plies.

In the manufacture of certain types of packages, such as tea bags, strings, strands or ribbons of, for example, cotton or silk, are secured between the layers or plies of the packaging material within the sealed zones for the attachment of tags, for example, as shown by Patent No. 2,149,713, dated March 7, 1939, but difficulty has been encountered in so securing the string as to prevent its being pulled longitudinally out of the sealed zone from between said plies and detached from the package.

One object of my invention is to provide a novel and improved method of sealing or adhesively securing together plies, layers, sheets, strips, ribbons or strands of material by a thermoplastic adhesive substance, whereby the necessity for pre-coating of the plies, etc., and the use of liquid adhesives, shall be avoided and a firm, secure and satisfactory seal shall be obtained.

Another object is to provide a package that shall have a novel and improved thermoplastic seal of the layers or plies of packaging material that shall be firm, secure and can be easily and inexpensively effected.

A further object is to provide a tea bag or the like formed of porous sheets or layers, such as paper, and having a tag attaching string sealed between said sheets or layers in a novel and improved, secure, simple and inexpensive manner.

Another object is to provide a tea bag or the like of the character described wherein said tag attaching string shall serve as an adhesive both to secure said sheets or plies together and to secure itself between said plies or sheets.

Other objects, advantages and results of the invention will appear from the following description in conjunction with the accompanying drawings in which Figure 1 is a plan view of a tea bag embodying my invention.

Figure 2 is a transverse vertical sectional view on the line 2—2 of Figure 1.

Figure 3 is a perspective view of another form of package embodying the invention.

Figures 4 and 5 are sectional views respectively on the lines 4—4 and 5—5 of Figure 3.

Figure 6 is a fragmentary perspective view showing the manner of applying the adhesive string or ribbon between the sheets or layers of the packaging material.

Figure 7 and 8 are fragmentary perspective views of two forms, respectively, of a string and a ribbon of thermoplastic adhesive embodying the invention.

Figure 9 is a perspective view of a partially completed bag or envelope having a portion of the string or ribbon freely extending from one side of the package for use in sealing the open mouth of the package after the latter has been filled.

Figure 10 is a fragmentary plan view of a "chain" or series of connected packages showing a modified manner of applying the string of thermoplastic substance thereto, and Figure 11 is a transverse vertical sectional view on the line 11—11 of Figure 10.

For the purpose of illustrating the principles of the invention, I have shown one embodiment thereof in a generally known type of tea bag that is composed of two sheets 1 and 2 of soft, fibrous, tough, water-resistant material, for example parchment paper, said sheets being secured together at their margins adhesively and also preferably by interdigitations or corrugations as indicated at 3 to form a container or commodity receiving compartment 4. One of the marginal portions serves as a tag as indicated at 5, and this tag is separable from the container portion 4 along a scored line or line of perforations 6. The tag 5 and the container portion 4 are connected by a string or the like 7 which has its ends secured between the sheets 1 and 2 in the sealed marginal portions of the structure so that when the tag is separated from the container portion, the tag and string serve as a handle by which the container portion may be immersed in a cup or pot of hot water.

Heretofore the string or the like 7 has been formed of vegetable fiber or silk, and it has been extremely difficult if not practically impossible to obtain a firm and secure sealing of the ends of the string between the plies or layers 1 and 2 in such a manner as to prevent said ends from pulling out of the sealed zones of the package and becoming detached from the package.

In accordance with one embodiment of my invention, I propose to form the string 7 of a thermoplastic substance, for example one of several suitable synthetic compositions, particularly "nylon," "Celanese" or polymerized vinyl compounds such as "Vinylite," and to form the sealed zones 3 under heat and pressure so that the ends of the string will become softened by the heat and will firmly adhere to the sheets or plies 1 and 2, particularly under the pressure which tends to force the softened thermoplastic material into intimate contact with the surfaces of the plies as shown in Figure 2. Under these conditions, the ends of the string that are disposed between the plies or sheets 1 and 2 will be firmly held against detachment from the package.

At the same time, the softened end portions of the string, when they become hardened upon cooling, also serve as an adhesive for securing the sheets together.

The invention also contemplates the use of a string, ribbon or strand of a thermoplastic substance such as described, particularly "nylon," as an adhesive for securing sheets or plies of material together, for example in forming sealed packages.

Figure 3 illustrates another type of package sealed in accordance with the invention, the package being shown as comprising two sheets or plies 8 and 9 of suitable packaging material, for example paper, having their marginal edge portions sealed together as at 10 to form a commodity receiving compartment 11.

In forming the package, the sheets are initially placed in juxtaposed relation as shown in Figure 6 and a string, strand or ribbon 12 of the thermoplastic adhesive substance is placed between marginal portions of the sheets to be sealed together, as shown in Figure 6. This may be done manually or by machine in any suitable manner. The marginal portions of the sheets are then pressed together under heat and pressure with the adhesive string or ribbon between them, whereupon the string or ribbon becomes softened, compressed and spread over the juxtaposed surfaces of the sheets 8 and 9 as shown at 13 in Figures 4 and 5. Upon hardening of the thermoplastic adhesive, the sheets are firmly adhesively secured together at said marginal portions. If desired, the marginal portions may also be interdigitated or corrugated as shown at Figures 3 and 5.

As above indicated, the thermoplastic adhesive may be in any suitable form such as a strand or string as shown in Figure 7 or a flat ribbon or strip as shown in Figure 8.

With my invention, it will be observed that the necessity for precoating of the packaging material with an adhesive is completely eliminated, and the thermoplastic adhesive substance may be easily handled in dry and hard condition on spools so as to be easily fed or threaded into the desired positions with respect to the zones of the sheets to be secured together so that the difficulties of handling and applying liquid adhesive during sealing operations are also obviated. The invention insures the firm, secure and satisfactory seal that can be obtained in a simple and inexpensive manner.

The thermoplastic substance may be of any suitable composition, and the heat will be applied at the proper temperature to soften the substance to the required degree during the sealing operation, while the amount of pressure applied will depend upon the characteristics of the thermoplastic substance and the layers of material to be joined together.

In addition to a string or the like formed wholly of thermoplastic material, I may use a string or the like formed of cotton, linen, silk or like materials and coated or impregnated with a thermoplastic substance.

In some instances it may be desirable to partially complete the formation of a bag or envelope, that is, seal the layers of packaging material together at all margins except one at which the layers are unsealed to leave a mouth for subsequent filling and closing of the bag, as illustrated in Figure 9. Here the two layers 13 of the packaging material are sealed together along three marginal portions 14, 15 and 16 by the thermoplastic adhesive substance 17 in the form of a string or ribbon. The other marginal portions of the layers are unsealed to form a mouth 18 for filling the package, and from one of the sealed marginal portions a portion of the string or ribbon of thermoplastic substance projects as at 19 to be used in sealing the layers together to close the mouth 18 after the package has been filled. With this feature of the invention, a manufacturer of bags or envelopes may partially complete the envelope or package shown and supply it to a commodity dealer who may place the desired commodity in the bag and then use the portion 19 of the thermoplastic adhesive string for closing the bag.

The thermoplastic string, strand or ribbon may be applied or affixed to or associated with the layers or sheets of packaging material in any of many suitable ways, one of which is shown in Figure 6. Another manner of applying the thermoplastic string to the package is shown in Figures 10 and 11 which illustrate a series or chain of packages that are formed by sealing together opposed layers or strips of packaging material along the longitudinal marginal portions of the strips as at 20 and at spaced transverse portions as at 21 to form commodity receiving compartments 22. The commodity may be placed in said compartments prior to the closing of each thereof in a manner known in the art, and the packages may be separated from each other and the chain immediately subsequent to the closing of each package or the transverse sealed zones 21 between adjacent packages may be perforated or scored as at 23 for removal of the packages from the chain after the chain has been completed.

Two strings, strands or ribbons of a thermoplastic adhesive 24 and 25 are utilized, and the strings may be fed, laid or threaded between the layers 26 and 27 of the packaging material so that a portion of each string may be used to seal the layers of packaging material together along one or more sides of the commodity receiving compartment 22 of each package, while portions of the other string serve to seal the layers together along the other sides of said compartment. As shown, the string 25 extends along one end and the upper side of one compartment as at *a* and *b* respectively, then along the opposite end and the upper side of the next adjacent compartment as at c and d respectively, while a portion of the string 24 extends along the other end of the first-mentioned compartment and the lower side of the second-mentioned compartment as at e and f respectively, and then extends along the opposite end of the second mentioned compartment and the lower side of a third compartment as at g and h respectively. Preferably the marginal portions of the packages will be sealed together progressively or successively under heat and pressure with the strings 24 and 25 in proper relation between the layers 26 and 27 to adhesively secure the layers together.

To avoid circumlocution, the term "strip" in the appended claims is intended to include all forms, such as a string, strand or flat ribbon, in which the thermoplastic substance may be used, and also to include a string, ribbon or strand of cotton, linen, silk or similar materials coated or impregnated with a thermoplastic substance.

Having thus described my invention, what I claim is:

1. A package comprising two opposed layers of packaging material having certain of their marginal portions sealed together by a strip of thermoplastic adhesive substance to form a commodity receiving compartment, other marginal portions of said layers being unsealed to form a mouth between them for insertion of a commodity into said compartment, and a portion of said strip of thermoplastic adhesive substance projecting from one of said sealed marginal portions to be inserted between said unsealed marginal portions for sealing the latter together after the commodity has been inserted into said compartment.

2. In a package which includes a commodity-receiving portion and an integral detachable tag portion both of which comprise two layers of material secured together in opposed relation to each other, a thermoplastic string whose ends are between said layers of said commodity-receiving portion and said tag portion respectively and have been adhesively secured to said layers by simultaneous pressure of said layers and said string together and application of heat thereto, a portion of said string intermediate said ends being free and unattached.

LEROY L. SALFISBERG.